(12) United States Patent
Sehgal et al.

(10) Patent No.: US 12,656,954 B2
(45) Date of Patent: *Jun. 16, 2026

(54) COMPUTE EXPRESS LINK DRAM + NAND SYSTEM SOLUTION

(71) Applicant: Micron Technology, Inc., Boise, ID (US)

(72) Inventors: Rohit Sehgal, Boise, ID (US); Vishal Tanna, Boise, ID (US); Krishna Siddhareddy, Boise, ID (US); Eishan Mirakhur, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/598,712

(22) Filed: Mar. 7, 2024

(65) Prior Publication Data

US 2024/0319880 A1     Sep. 26, 2024

Related U.S. Application Data

(60) Provisional application No. 63/491,480, filed on Mar. 21, 2023.

(51) Int. Cl.
*G06F 3/00* (2006.01)
*G06F 3/06* (2006.01)
*G06F 12/00* (2006.01)

(52) U.S. Cl.
CPC .......... *G06F 3/0611* (2013.01); *G06F 3/0634* (2013.01); *G06F 3/0659* (2013.01); *G06F 3/0673* (2013.01)

(58) Field of Classification Search
CPC .... G06F 3/0611; G06F 3/0634; G06F 3/0659; G06F 3/0673
(Continued)

(56) References Cited

U.S. PATENT DOCUMENTS

| | | | |
|---|---|---|---|
| 5,845,139 A | 12/1998 | Fischer | |
| 6,553,415 B1 * | 4/2003 | Manwiller | H04L 69/323 |
| | | | 710/10 |

(Continued)

FOREIGN PATENT DOCUMENTS

| | | |
|---|---|---|
| KR | 1020130023579 A | 3/2013 |

OTHER PUBLICATIONS

International Search Report and Written Opinion from International Application. No. PCT/US2024/019249 mailed Jul. 29, 2024.

*Primary Examiner* — Sheng Jen Tsai
(74) *Attorney, Agent, or Firm* — Wood IP, LLC; Theodore A. Wood

(57) ABSTRACT

Provided is a system comprising a first interface configured to receive first data from an external computing device, non-volatile memory operatively coupled to the first interface, and a second interface configured to communicate with a host computing device. The system also includes dynamic random-access memory (DRAM) operatively coupled to the second interface, a memory controller operatively coupled to the second interface and the DRAM and configured to control a transfer of information between the DRAM and the host computing device through the second interface, and processing circuitry at least configured to store the first data received through the first interface in the non-volatile memory.

20 Claims, 4 Drawing Sheets

(58) Field of Classification Search
USPC ........................................................ 711/105
See application file for complete search history.

(56) References Cited

U.S. PATENT DOCUMENTS

| | | | |
|---|---|---|---|
| 7,089,412 B2 * | 8/2006 | Chen .................... | G06F 13/1689 713/2 |
| 8,880,791 B2 * | 11/2014 | Chen ..................... | G11C 11/005 711/170 |
| 8,977,831 B2 * | 3/2015 | Moshayedi ............ | G11C 5/143 714/22 |
| 9,171,585 B2 * | 10/2015 | Rajan ........................ | G11C 5/06 |
| 9,785,355 B2 * | 10/2017 | Huang .................. | G06F 3/0688 |
| 10,679,722 B2 * | 6/2020 | Helmick ............... | G11C 29/52 |
| 10,831,963 B1 * | 11/2020 | Chen ........................ | G06F 30/39 |
| 10,910,048 B1 * | 2/2021 | Ramesh ................. | G06F 9/546 |
| 11,016,918 B2 * | 5/2021 | Chen .................... | G06F 13/4243 |
| 11,314,508 B1 * | 4/2022 | Napier ................. | G06F 3/0656 |
| 11,500,801 B2 * | 11/2022 | Lai .......................... | G06F 13/28 |
| 11,581,024 B2 * | 2/2023 | Lym ....................... | G11C 5/141 |
| 11,635,910 B2 * | 4/2023 | Keeth ................ | G06F 11/1048 365/63 |
| 11,675,503 B1 * | 6/2023 | Ekins .................... | G06F 3/0637 711/163 |
| 11,954,220 B2 * | 4/2024 | Ekins .................... | G06F 21/604 |
| 11,989,141 B2 * | 5/2024 | Keeth ................. | H01L 25/0652 |
| 12,014,078 B2 * | 6/2024 | Chen ........................ | G11C 5/04 |
| 12,086,431 B1 * | 9/2024 | Dreier ................. | G06F 16/1827 |
| 12,189,944 B1 * | 1/2025 | d'Abreu ............... | G06F 3/0607 |
| 2006/0294295 A1 * | 12/2006 | Fukuzo .............. | G06F 13/1673 711/105 |
| 2007/0198796 A1 * | 8/2007 | Warren, Jr. ......... | G06F 12/0866 711/E12.04 |
| 2009/0172499 A1 * | 7/2009 | Olbrich ................. | G06F 3/0604 714/773 |
| 2010/0017540 A1 * | 1/2010 | Okabayashi ..... | G06K 19/07345 710/36 |
| 2010/0125695 A1 * | 5/2010 | Wu ....................... | G06F 12/084 711/E12.083 |
| 2012/0173809 A1 * | 7/2012 | Ko ....................... | G06F 12/0893 711/E12.001 |
| 2012/0254574 A1 * | 10/2012 | Sinclair ............... | G11C 11/5628 711/E12.002 |
| 2012/0284587 A1 * | 11/2012 | Yu ....................... | G06F 12/0868 711/E12.008 |
| 2013/0060993 A1 * | 3/2013 | Park .................... | G06F 16/9535 711/149 |
| 2013/0086309 A1 * | 4/2013 | Lee ..................... | G06F 13/4022 711/E12.008 |
| 2013/0145085 A1 * | 6/2013 | Yu ....................... | G06F 12/0246 711/103 |
| 2013/0194689 A1 * | 8/2013 | Takai ............... | G11B 20/10009 |
| 2014/0304462 A1 * | 10/2014 | Venugopal .............. | G06F 13/16 711/104 |
| 2015/0106556 A1 * | 4/2015 | Yu ....................... | G06F 12/0246 711/103 |
| 2015/0106557 A1 * | 4/2015 | Yu ..................... | G11C 13/0004 711/103 |
| 2015/0221370 A1 * | 8/2015 | Kim .................... | G11C 14/0018 711/103 |
| 2015/0261446 A1 * | 9/2015 | Lee ....................... | G06F 13/385 711/105 |
| 2016/0202908 A1 * | 7/2016 | Lin ....................... | G06F 3/0604 711/103 |
| 2017/0040057 A1 * | 2/2017 | Cho ........................ | G06F 13/16 |
| 2017/0060434 A1 * | 3/2017 | Chang .................. | G06F 3/0679 |
| 2017/0075576 A1 * | 3/2017 | Cho ....................... | G11C 11/005 |
| 2018/0059944 A1 * | 3/2018 | Helmick ............ | G06F 11/1048 |
| 2018/0059976 A1 * | 3/2018 | Helmick .............. | G06F 3/0659 |
| 2018/0121121 A1 * | 5/2018 | Mehra .................... | G06F 3/061 |
| 2018/0143904 A1 * | 5/2018 | Sweere ................ | G06F 3/0619 |
| 2018/0232310 A1 * | 8/2018 | Chang ............... | G06F 12/0864 |
| 2020/0133565 A1 * | 4/2020 | Kim .................... | G06F 12/0891 |
| 2021/0055863 A1 * | 2/2021 | Sun ........................ | G06F 3/064 |
| 2021/0124692 A1 | 4/2021 | Benisty | |
| 2021/0132856 A1 * | 5/2021 | Chen .................... | G11C 7/1075 |
| 2021/0373790 A1 * | 12/2021 | Henderson ........... | G06F 3/0673 |
| 2022/0292017 A1 * | 9/2022 | Symons ............. | G06F 12/0804 |
| 2024/0243935 A1 * | 7/2024 | Garcia ................... | G06F 1/189 |
| 2024/0319880 A1 * | 9/2024 | Sehgal ................. | G06F 3/0673 |
| 2024/0319896 A1 * | 9/2024 | Sehgal ................ | G06F 3/0659 |
| 2025/0190148 A1 * | 6/2025 | Miller .................. | G06F 3/0679 |

* cited by examiner

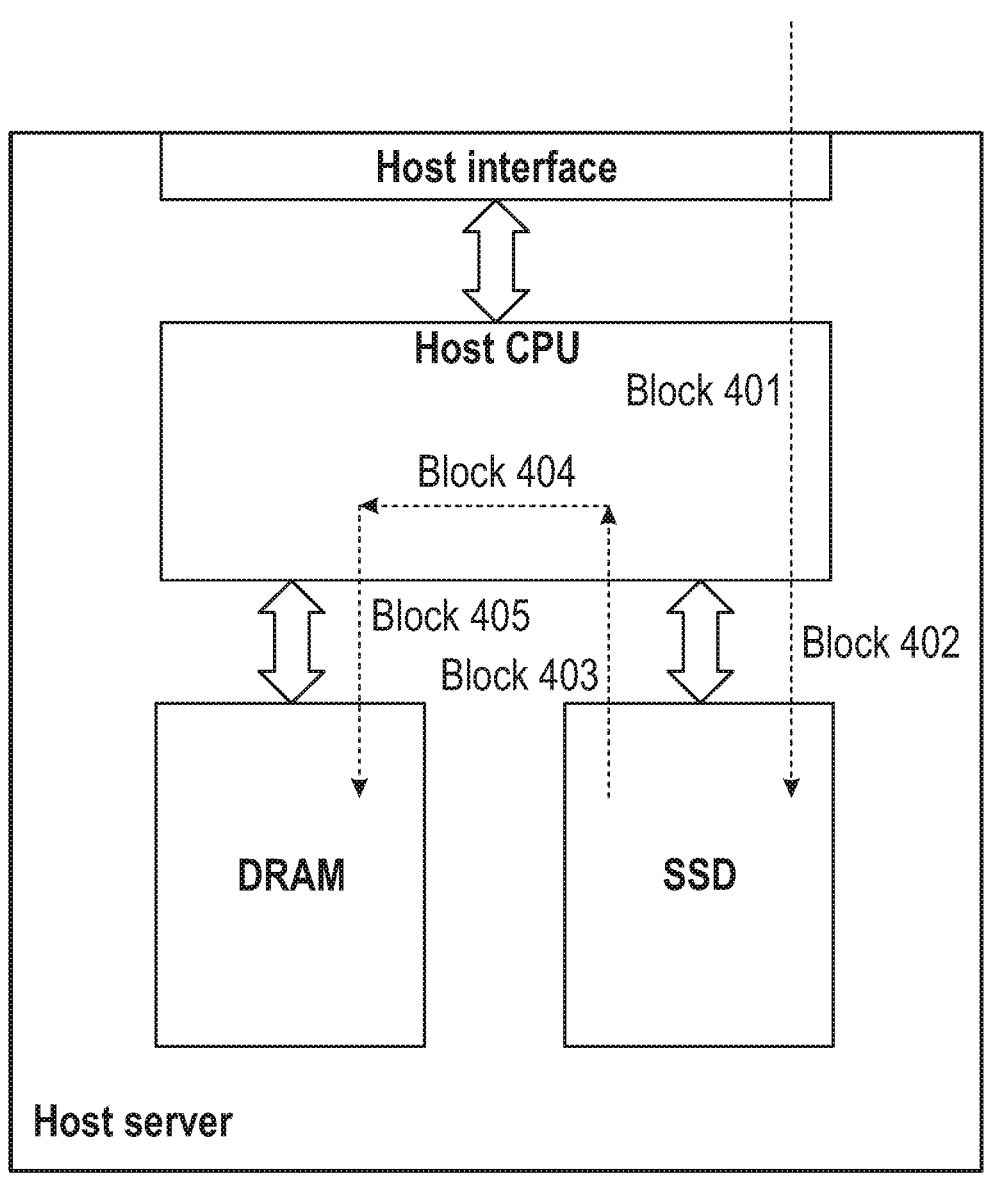
FIG. 4 (Conventional)

COMPUTE EXPRESS LINK DRAM + NAND SYSTEM SOLUTION

CROSS-REFERENCE TO RELATED APPLICATION

This application claims benefit to U.S. Provisional Patent Application No. 63/491,480, filed Mar. 21, 2023, the disclosure is incorporated herein by reference in its entirety.

FIELD OF TECHNOLOGY

The present disclosure relates generally to semiconductor memory devices ad methods, and systems.

BACKGROUND

Memory devices (also referred to as memory media devices) are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), DRAM, synchronous dynamic RAM (SDRAM), static RAM (SRAM), flash memory, and others. Memory devices may be volatile or non-volatile. Volatile memory cells (e.g., DRAM cells) may lose their programmed states over time unless they are periodically refreshed by an external power source. SRAM memory may maintain their programmed states for the duration of the system being powered on. Non-volatile memory cells, for example, a solid-state drive (SSD) comprised of Not-And (NAND) memory cells may maintain their programmed states for extended periods of time even in the absence of an external power source.

Memory devices may be coupled to a host (e.g., a host computing device) to store data, commands, and/or instructions for use by the host while the computer or other electronic system is operating. For example, data, commands, control signals and/or instructions can be transferred between the host and the memory device(s) during operation of a computing or other electronic system. A controller, referred to as a memory controller", may be used to manage the transfer of data, commands, and/or instructions between the host and the memory devices.

The commands received by the memory controller from the host may include read commands and write commands. When the host sends a write command to the memory controller, the host system can still run independently. However, when the host sends a read command to the memory controller, an application run on a central processing unit (CPU) connected to the host may become disadvantageously locked up or delayed while waiting for data to be acquired in response to the sent read command.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

FIG. 4 illustrates functional block diagram showing a computing system according to a conventional implementation.

DETAILED DESCRIPTION

The present disclosure describes systems, apparatuses, and methods related to a task processor processing data received through an ethernet or Wi-Fi port and storing the received data directly in non-volatile memory such that the host computing device does not have to perform the tasks associated with receiving and storing the data in the non-volatile memory to thereby free up the host computing device to execute other instructions to perform other tasks.

The task processor obtains the data from the non-volatile memory and further performs further processing of the data such as indexing, ticketing, sorting and/or performing other customized task(s) and stores the process data in DRAM such that the host computing device does not have to perform these tasks either, again freeing up the host computing device execute other instructions to perform other tasks. The burden on the CPU of the host computing device to perform these redundant tasks is reduced because these redundant tasks have been offloaded to the task processor, which is separate from the host CPU.

The processing of the data puts the data stored in the DRAM in a sorted/indexed format that enables easy accessibility to the applications executed by the host computing device through operation of a memory controller, such as compute express link (CXL) memory controller) and interface (such as a PCIe interface), thereby reducing the latency of access to the sorted/indexed data as per required customer specifications. IC chips forming the memory controller, DRAM, non-volatile memory and the task processor may be mounted on the same printed circuit board. The memory controller can perform a process in which operation is performed in two different modes: the device bias mode of operation in which the task processor can access data in the DRAM and the host bias mode of operation in which the host computing device has access to data in the DRAM and the task processor does not have access to the data in the DRAM.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

Figure 1:
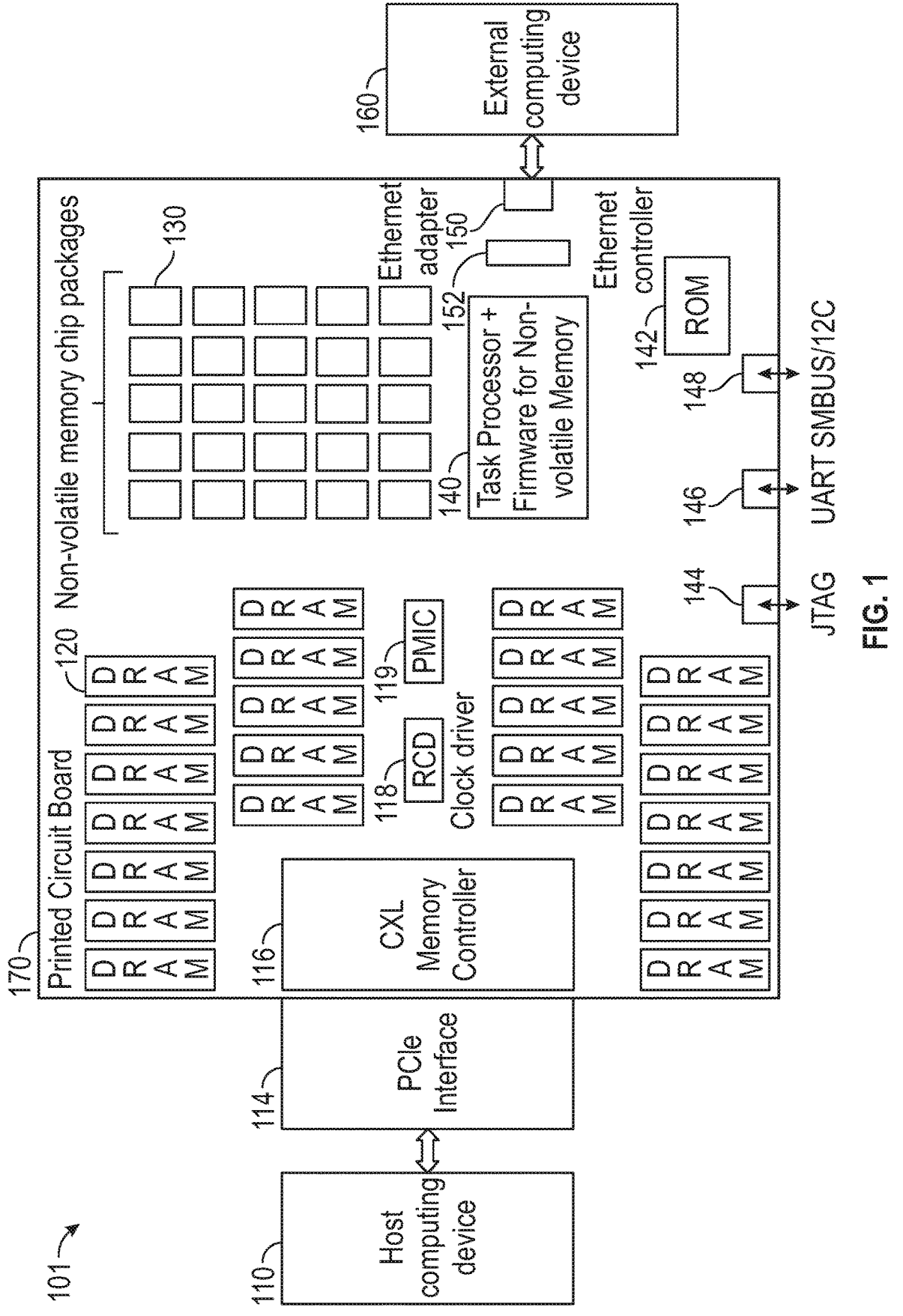
FIG. 1 illustrates an example computing system having a printed circuit board including mounted integrated circuit (IC) chips respectively implementing at least a DRAM, a non-volatile memory, a memory controller, and a task processor according to some example embodiments of the present disclosure.

FIG. 1 illustrates an example computing system 101 according to some example embodiments of the present disclosure. The computing system 101 includes a host interface 114, a memory controller 116, a Registered Clock Driver (RCD) circuit 118, a clock driver, a power management integrated circuit (PMIC) 119, DRAM 120, non-volatile memory 130, a task processor 140 including firmware for executing task associated with the non-volatile memory 130, ROM 142, a Joint Test Action Group (JTAG) connector 144, a universal asynchronous receiver-transmitter (UART) connector 146, a SMBUS/12C connector 148, an ethernet adapter 150, and an ethernet controller 152.

The computing system 101 also includes a printed circuit board 170 with electrical components mounted thereon. These mounted electrical components include IC chips respectively implementing the memory controller 116, the RCD circuit 118, the PMIC 119, DRAM 120, non-volatile memory 130, a task processor 140, ROM 142, and an ethernet controller 152. These mounted electrical components also include physical connectors forming the JTAG connector 144, the UART connector 146, the SMBUS/12C connector 148, and the ethernet adapter 150.

The computing system 101 can be operatively coupled to a host computing device 110 (i.e., a host computer system) and an external computing device 160, which are separate devices from each other as shown in FIG. 1. The computing system 101 can be operatively coupled to the host computing device 110 through the host interface 114 and the external computing device 160 through the ethernet adapter 150.

The memory controller 116 of the computing system 101 may at least include memory, an operating system and a CPU or processing circuitry including firmware, each of which may communicate with one other via a bus or other communications mechanisms including wireless communications mechanisms. The memory controller 116 can control a transfer of information such as data, commands, control signals and/or instructions between the DRAM 120 and the host computing device 110 through the host interface 114.

In the example embodiment illustrated in FIG. 1, DRAM 120 can be used to store data such as data to be read from the DRAM 120 through the memory controller 116 and host interface 114 to the host computing device 110 or data written by the host computing device 110 on the DRAM 120 through the host interface 114 and memory controller 116. In some embodiments, DRAM memory 120 is formed by high storage density DRAM cells that lose their state over time. That is, cells of the DRAM memory 120 must be refreshed periodically, hence the name dynamic.

DRAM can be described as being organized according to a hierarchy of storage organization comprising a dual in-line memory module (DIMM), rank, bank, and array. Embodiments are not however limited thereto, and other volatile memory can alternatively be used instead of the DRAM 120 such as random access memory (RAM) or synchronous dynamic random access memory. While the example embodiment illustrated in FIG. 1 shows 24 IC chips forming the DRAM 120, the number of IC chips and hence the amount of memory capacity forming the DRAM 120 can be scaled to a different number of chips and hence different amount of memory capacity as needed.

Non-volatile memory 130 is used to store data such as data directly received from the external computing device 160 through the ethernet adapter 150 (or additionally or alternatively a Wi-Fi interface) through operation of the ethernet controller 152 and task processor 140. The non-volatile memory 130 may include flash memory, electrically erasable programmable ROM (EEPROM), static RAM (SRAM), erasable programmable ROM (EPROM), resistance variable memory, such as phase-change random-access memory (PCRAM), resistive random-access memory (RRAM), magnetoresistive random-access memory (MRAM), or 3D XPoint™ memory. A flash memory forming the non-volatile memory 130 may include NAND and Not-Or (NOR) architectures.

Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. While the example embodiment illustrated in FIG. 1 shows 25 IC chips forming the non-volatile memory 130, the number of IC chips and hence the amount of memory capacity forming the non-volatile memory 130 can be scaled to a different number of chips and hence a different amount of memory capacity as needed. For example, if the non-volatile memory 130 is implemented by NAND storage devices, the non-volatile memory 130 implemented by the NAND storage devices can be scaled in the box or chassis to a capacity as desired.

Non-limiting example embodiments of the memory controller 116 may include the following features: the host interface 114, an input interface, read and write data memory for caching data, read and write command memory for caching commands, a CPU and/or processing circuitry and firmware including integrated circuit(s) for executing commands from the host computing device 110 to control reading/writing operations from/to the memory 120, 130 (particularly the DRAM 120 if low latency is required) and to provide a translation layer between the host computing device 110 and the memory 120, 130. The memory controller 116 is configured to operatively couple to the memory 120, 130 through a plurality of channels, including control signal lines and data bus lines, which can be used to read/write data from/to the memory 120, 130, to transmit commands to the memory 120, 130, to receive status and statistics from the memory 120, 130, etc.

The host interface 114 may be operatively coupled to the host computing device 110 and the input interface of the memory controller 116 through input/output (I/O) paths such as control signal lines and data bus lines. Commands, control signals, and/or data may be communicated between the host computing device 110 and the input interface of the memory controller 116 through the host interface 114. The communications over the I/O paths to the host computing device 110 may be according to a protocol such as, for example, Peripheral Component Interconnect Express (PCIe).

In some embodiments, the plurality of I/O paths can be configured as a single port. Example embodiments are not limited by the number of I/O paths, whether or not the I/O paths belong to a single port, or by the communication protocol for communicating with the host computing device 110. The communications over the I/O paths to the host computing device 110 may include commands and/or control signals as well as associated data. The host interface 114 may include interface management circuitry including data link and transaction control which may provide higher layer protocol support for communications with the host computing device 110 through the host interface 114.

The host interface 114 may handle the protocol such as the CXL protocol to communicate with the host computing device 110 such that the memory controller 116 may be regarded as a CXL memory controller 116 and the host interface 114 may be regarded as a PCIe interface 114. The memory controller 116 can thus be a CXL compliant memory system (e.g., the memory system can include a PCIe/CXL interface). CXL is a high-speed CPU-to-device and CPU-to-memory interconnect protocol that uses the PCIe physical layer for transmission of FLITs (flow control units—data packets from host to device) an is designed to accelerate next-generation data center performance. CXL technology maintains memory coherency between the CPU memory space and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as I/O protocol, memory protocol (e.g., initially allowing a host to share memory with an accelerator), and coherency interface. If the memory controller 116 is CXL compliant, the processing circuitry of the memory controller 116 may use CXL protocols to manage the host interface 114 which may comprise PCIe physical (PHY) interfaces.

The CXL memory controller 116 is a type-2 device which can operate in either a host bias mode of operation or a device bias mode of operation. When the CXL memory controller 116 is in the host bias mode of operation, data present in the DRAM 120 is accessible to the host computing device 110 as its memory is mapped to the host computing device 110.

When the CXL memory controller 116 is in the device bias mode of operation, the task processor 140 can receive data from the ethernet adapter 150 and store in the non-volatile memory 130. The task processor 140 may also extract the data from the non-volatile memory 130 and perform a task (from a list of already predefined tasks) on the data. After the task is completed, the processed data may be moved into the DRAM memory 120, and the bias mode of operation is changed to the host bias mode. Once the CXL memory controller 116 is back in the host bias mode, the host computing device 110 can access the data in the DRAM 120 while the task processor 140 can still execute instructions to accept additional data over the ethernet adapter 150 and store the received additional data in the non-volatile memory 130.

The input interface of the memory controller 116 may communicate commands, control signals and/or data to the host computing device 110 through the host interface 114. The input interface of the memory controller 116 may also be operatively coupled to read and write data memory using cxl.mem protocol and read and write command memory via corresponding control signal lines and data bus lines.

As illustrated in FIG. 1, the respective IC chips forming the memory controller 116, DRAM 120, non-volatile memory 130 and task processor 140 are all on the same printed circuit board 170. An ethernet adapter 150 and an IC chip forming ethernet controller 152 are also mounted on the same printed circuit board 170. The ethernet adapter 150 and ethernet controller 152 enable data to be received from the external computing device 160, including for example receipt of non-volatile memory express (NVME) data packets. The ethernet controller 152 may at least include memory, an operating system and a CPU or processing circuitry and firmware for enabling the data to be received from the external computing device 160 through the ethernet adapter 150 such that the received data may be processed (e.g., by the ethernet controller 152 and task processor 140) and stored in the non-volatile memory 130.

The task processor 140 may be an application specific integrated circuit (ASIC) which executes firmware to support the movement of data received from the external computing device 160 through the ethernet adapter 150 and ethernet controller 152 to the non-volatile memory 130. The task processor 140 may also execute firmware to keep track of where the data is residing physically on the non-volatile memory 130. The task processor 140 is a subsystem in the box or chassis of the computing system 101 that is highly customizable such that it can work on required tasks as desired by a customer/user.

For example, in banking transactions, the non-volatile memory 130 may be used to store the incoming banking transaction data received by the ethernet adapter 150 from different customers during the day via execution provided by the task processor 140, and the task processor 140 can then further execute a routine or periodic (e.g., every 12 hours) sorting or indexing on the data at night and have it available in storage by the DRAM 120 during the next day time such that any host CPU of respective host computing devices can then access the sorted or indexed data from the DRAM 120 at high speed and low latency. The execution by the task processor 140 thus make sure that the data stored in the DRAM 120 is in a format that the host computing device 110 expects so that access and processing by the host computing device 110 can be done faster.

An IC chip forming a ROM 142 is also mounted on the same printed circuit board 170. The ROM 142 stores data and instructions to make it possible to initialize all of the hardware components of the computing system 101 upon power on.

A JTAG connector 144, UART connector 146, and a SMBUS/12C connector 148 are also available on the same printed circuit board 170. Via communications provided through these connectors 144-148 to external devices, debug activity on the computing system 101 can be facilitated.

Figure 2:
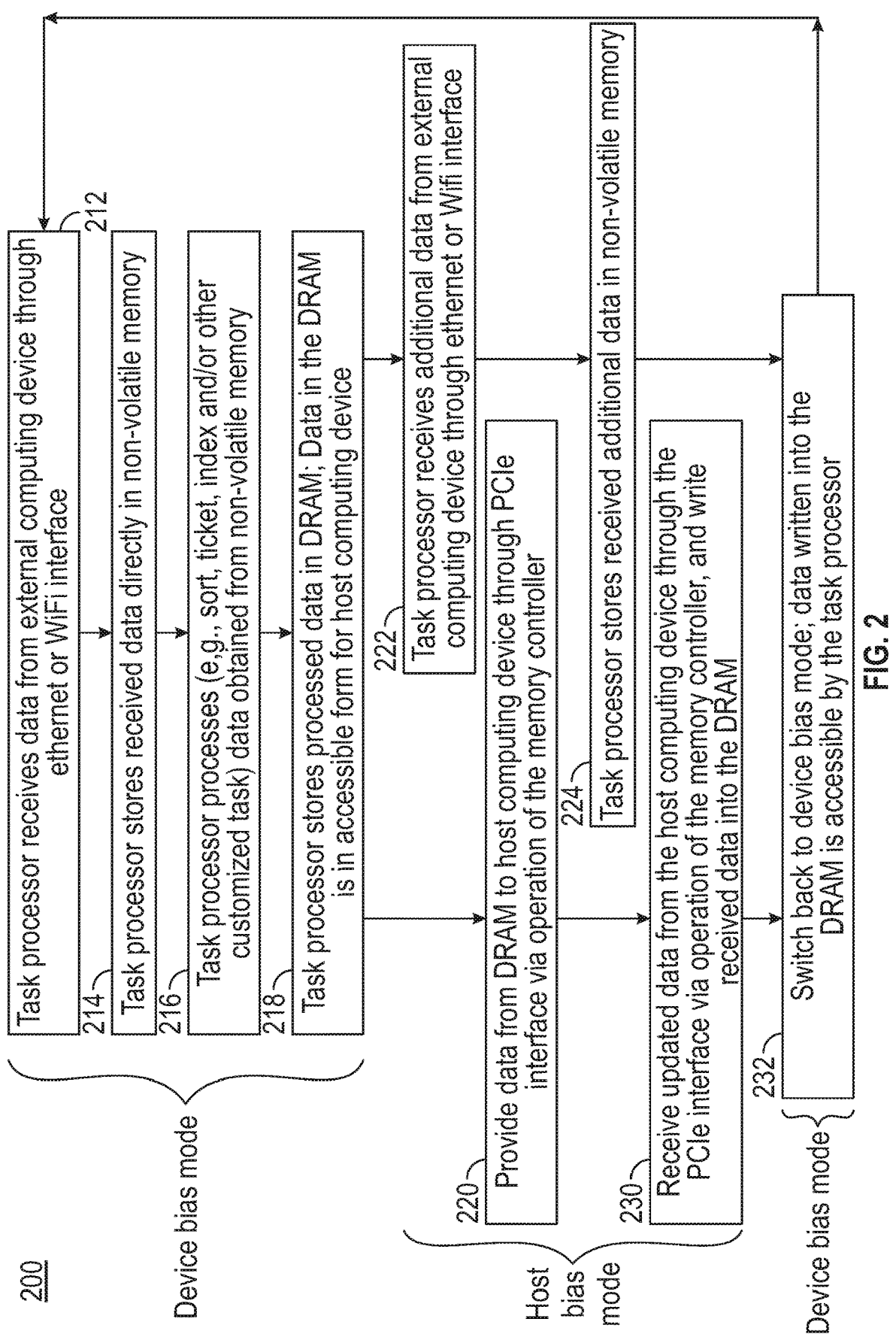
FIG. 2 illustrates a flowchart depicting a process performed by the computing system according to some example embodiments of the present disclosure.
Figure 3:
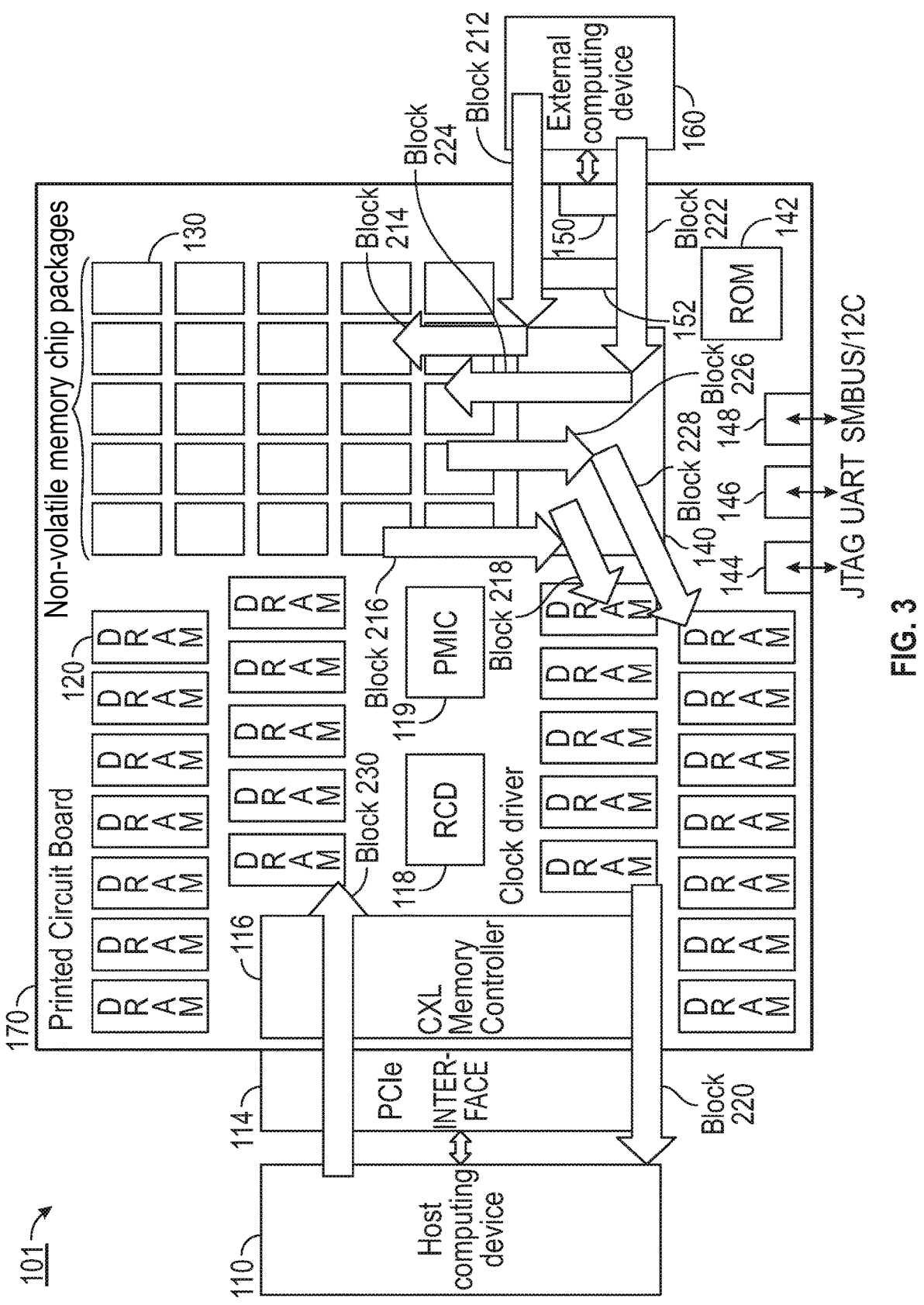
FIG. 3 illustrates example blocks of the process performed by the computing system the computing system having the printed circuit board including mounted IC chips respectively implementing at least the DRAM, the non-volatile memory, the memory controller, and the task processor according to some example embodiments of the present disclosure.

As illustrated in FIGS. 2-3, example embodiments of the computing system 101, including the IC chips forming the memory controller 116, the DRAM 120, the non-volatile memory 130 and the task processor 140 mounted on the same printed circuit board 170, perform a process in which operation can be switched between and performed in two different modes: (i) the device bias mode of operation and (ii) the host bias mode of operation.

Blocks 212-218 illustrated in FIGS. 2-3 are performed while the memory controller 116 is in the device bias mode. Blocks 220-230 of FIGS. 2-3 are performed while the memory controller 116 is in the host bias mode. Block 232 is performed while the memory controller 116 is in the device bias mode. The task processor 140 can access the data stored in the DRAM 120 in the device bias mode of operation while the host computing device 110 does not. However, the task processor 140 cannot access the data stored in the DRAM 120 in the host bias mode of operation. That is, the host computing device 110 has access to data stored in the DRAM 120 rather than the task processor 140 in the host bias mode of operation.

In block 212 of the device bias mode of operation, data originating from an external computing device 150 is received by the computing system 101 through the ethernet adapter 150 (or additionally or alternatively received through a Wi-Fi interface) via operation of the ethernet controller 152 and task processor 140. The received data is processed by the ethernet controller 152. The data received may be NVME data packets. Although only one external computing device 160 in shown in FIG. 1 for providing the data such as the NVME data packets to be received by the ethernet adapter 150, it will be understood that there may instead be a plurality of external computing devices that provide this data, which can be later sorted or indexed by the task processor 140.

In block 214 of the device bias mode of operation, the task processor 140 executes firmware to support movement of the data received by the ethernet adapter 150 to the non-volatile memory 130. The task processor 140 executes firmware to keep track of where the data is residing physically on the non-volatile memory 130. It is therefore the task processor 140 which enables the data received through the ethernet adapter 150 to be stored in the non-volatile memory 130, rather than a CPU of the host computing device 110. In block 214 when the computing system 101 is in the device bias mode of operation, slot(s) of the DRAM 120 that is being unused by the host computing device 110 can be used as a buffer space for holding data until the data can be moved into the non-volatile memory 130.

In other words, the data received through the ethernet adapter 150 is ultimately stored in the non-volatile memory 130 by initially storing or buffering the data received through the ethernet adapter 150 in unused cells of the DRAM 120 and then transferring this data, stored in the DRAM 120, to the non-volatile memory 130. The data written on the non-volatile memory 130 are certain types of data which can then be accessed using a key-value pair or indexed or sorted such that the indexed or sorted data is ultimately moved to and stored in the DRAM 120 so that the host computing device 110 can act on the data stored in the DRAM 120 quickly and efficiently.

In Block 216 of the device bias mode of operation, the task processor 140 executes firmware to obtain and process the data stored in the non-volatile memory 130. The processing of this data may include sorting, ticketing, indexing and/or performing any other customized task. In Block 218 of the device bias mode of operation, the task processor 140 provides further execution to store the processed data in the DRAM 120. As a result, the sorted/indexed data is stored in the DRAM 120 in a format for ready access by an application running on a CPU of the host computing device 110. As is the case in blocks 212-214, blocks 216-218 are performed using the task processor 140, rather than using a CPU of the host computing device 110.

The data has therefore been put into the DRAM 120 in block 218 for efficient access by the host computing device 110 without any load being placed on a host CPU of the host computing device 110 since the tasks required to put the data into the DRAM 120 were performed by the task processor 140 without the host computer device 110. The task processor 140 can then repeat Blocks 212-218 for any data that is newly received through the ethernet adapter 150, thereby resulting in even more data being placed into the DRAM 120. All of the data stored in the DRAM 120 is accessible to the host computing device 110 with reduced latency. The data in the DRAM 120 can be accessed by the host computing device 110 when the memory controller 116 is switched to the host bias mode of operation.

In block 220, the memory controller 116 is switched to and operates in the host bias mode. In this host bias mode of operation, the memory controller 116 may execute a command received from the host computing device 110 through the host interface 114 to transfer data between the host computing device 110 and the DRAM 120. For example, the memory controller 116 can execute a read command so that the data, that was stored in the DRAM 120 as a result of the task processor 140 performing blocks 212-218 while in the device bias mode, can be provided from the DRAM 120 to the host computing device 110 through the host interface 114 via operation by the memory controller 116. Since the data being provided to the host computing device 110 as a result of the read command executed by the memory controller 116 is stored in the DRAM 120, the requesting host computing device 110 can receive the data from the DRAM 120 with reduced latency.

While the host computing device 110 is busy receiving the data from the DRAM 120 in the host bias mode of operation, the task processor 140 does not need to be idle. For example, while the host computing device 110 is receiving the data from the DRAM 120, the task processor 140 can perform any one or more of blocks 222-224 at the same time. Blocks 222-224 resemble blocks 212-214 but are performed on additional data that has been received through the ethernet adapter 150 later than the data received and processed in blocks 212-218.

That is, in blocks 222-224, additional data is received from the external computing device 160 by the ethernet adapter 150 through operation provided by the ethernet controller 152 and task processor 140, and then stored in the non-volatile memory 130. The task processor 140 executes firmware instructions to receive this additional data and store it directly in the non-volatile memory 130 in block 222 (without putting any additional load on the host computing device 110 which is itself still busy receiving other data from the DRAM 120).

In block 230, the memory controller 116 continues to operate in the host bias mode. Data generated and processed by the host computing device 110 can be transmitted through the host interface 114 via execution by the memory controller 116 to write data to the DRAM 120. The memory controller 116 can thus execute a write command from the host computing device 110 such that data generated and transmitted by the host computing device 110 is newly written into the DRAM 120. This data that is generated and transmitted by the host computing device 110 and is newly written into the DRAM 120 may include data generated as a result of processing data that was previously obtained from the DRAM such as data stored in the DRAM by performing blocks 212-218.

In block 232, a signal from the host computing device 110 can be received by the memory controller 116 which instructs a switch of operation back to the device bias mode. For example, the host computing device 110 may transmit this signal to cause the switch back to the device bias mode after the host computing device 110 has completed its required operations (e.g., the host computing device has completed its consumption of the data from the DRAM 120 in blocks 220 and 230).

After the memory controller 116 has switched back to the device bias mode, the data stored by the DRAM 120 may be accessed by the task processor 140, including the data that has been newly written into the DRAM 120 from the host computing device 110 through the host interface 114 and by operation performed by the CXL memory controller 116. The task processor 140 can therefore access data of the DRAM 120 and/or the non-volatile RAM 130 in the device bias mode. Once the new data has been received in the DRAM 120 by the host computing device 110 and the system is in the device bias mode, the next step is for the task processor 140 to act on that data to perform any customized computation (indexing etc.) and store or move that data to the NAND flash. Therefore, the task processor 140 can pull in the data from the NAND flash, get the new data from the host computing device 110 (sitting in the DRAM 120) and use both the data to perform the computation and store the data back on the NAND flash. Before moving the device in host bias mode again, the indexed and sorted data on the NAND flash is moved back to the DRAM 120 for low latency access by the host computing device 110.

The computing system 101 can therefore make use of CXL.io protocol to transfer NVME data packets which can then be used to update the information in the non-volatile memory 130. Both CXL.mem and CXL.io (NVME packets wrapped inside) provided to the memory 120, 130 contains this kind of shared architecture. The DRAM 120 is memory-mapped so that low latency, high bandwidth access to the DRAM 120 can be shared but can also provide intelligence to parse NVME data packets shared over the CXL.io.

Now in the device bias mode, the process 200 can then cycle back to block 212 and repeat itself.

As discussed above, the DRAM 120 and the non-volatile memory 130 can be mounted onto a same printed circuit board 170. In other words, the DRAM 120 and the non-volatile storage 130 can be integrated into a single box or chassis. By also including the task processor 140, which can perform customized routine batch tasks and have the data in the non-volatile memory 130 sorted or indexed and then stored in the DRAM 120 for ready access by the host computing device 110, on the same printed circuit board 170 (and hence within the same single box or chassis), the computing system 101 having the DRAM 120 and the non-volatile memory 130 can be more versatile and more compact and also provides an opportunity that would be exemplary for hyper scalers and multiple other enterprise customers.

The DRAM 120, which is mounted onto a same printed circuit board 170 or integrated into a single box or chassis as the non-volatile memory 130, the task processor 140 and memory controller 116, may be accessible by a host computing device 110 via the PCIe interface 114 and CXL memory controller 116. The non-volatile memory 130 may directly store data received via an ethernet adapter and controller 150, 152 (and/or Wi-Fi port) through operation of the task processor 140 rather than any operation by the host computing device 110. In other words, the non-volatile memory 130 can directly receive and store the data received through ethernet adapter and controller 150, 152 and task processor 140 independent of the host computing device 110.

The tasks associated with receiving and storing the data received through the ethernet adapter and controller 150, 152 as well as the tasks associated with obtaining and moving the received data to the non-volatile memory 130 and storing the received data in the non-volatile memory are performed by the task processor 140, and not the host computing device 110. This frees up the host computing device 110 to perform other tasks required by any application being executed by the host CPU. For example, and as discussed above, the host computing device 110 may perform the task associated with reading data from the DRAM 120 (while the CXL memory controller 116 is in the host bias mode) while other data is being received by the ethernet adapter and controller 150, 152 and/or this received other data is stored by the non-volatile memory 130.

The tasks that are performed by the task processor 140 are not necessarily time critical (e.g., maintenance activities which are required to be done using the task processor daily), but need to be done. Examples of the data from the external computing device may be key-value pairs, photographs, bank transactions done through the day, etc. The data written on the non-volatile memory 130 are thus certain types of data that can be accessed using a key-value pair or indexed or sorted. After this data is sorted or indexed by the task processor 140, this data may be placed in the DRAM 120 to be used by the host computing device 110 as necessary.

Once the tasks performed by the task processor 140 are done such that the sorted/indexed data is stored in the DRAM 120, the access time to that data stored in the DRAM 120 should be minimal. Accordingly, the data needs to be stored in the DRAM 120 to reduce latency when the data is transmitted to the host computing device 110. By processing (e.g., sorting or indexing) the data stored by the non-volatile memory 130 and moving this data to the DRAM 120, the data now stored in the DRAM 120 can be accessed by the host computing device 110 with reduced latency.

The task processor 140 is capable of performing the tasks in such a way so as to utilize the DRAM 120 and minimize the endurance impact on the non-volatile memory 130 while performing the tasks. Once the tasks are completed, the data is ready in the DRAM 120 to be used by the host computing device 110. The host computing device 110 may initially relinquish control on the DRAM 120 (i.e., in the device bias mode of operation) and gives control to the task processor 140 to be used as necessary.

Providing the memory controller 116, DRAM 120, non-volatile memory 130 and task processor 140 on the same printed circuit board or in the same box or chassis provides an advantage because there are certain DRAM slots that could be used to store the incoming data into the non-volatile memory 130 as an extensible DRAM storage available to the storage provided by the non-volatile memory 130.

This can provide extra performance to the host storing data on the non-volatile memory 130. This data can be later transferred to the non-volatile memory 130 from the DRAM 120. This is possible when the DRAM slots are used in the device bias mode instead of the host bias mode. Secondly, any active logging or failures that may happen in real time on the non-volatile memory 130 can also be logged on the high-capacity DRAM space available. These advantages are achieved by boxing the memory controller 116, DRAM 120, non-volatile memory 130 and task processor 140 on a same printed circuit board or within a same box or chassis.

As used herein, the term "substantially" intends that the characteristic needs not be absolute, but is close enough so as to achieve the advantages of the characteristic. For example, "substantially simultaneously" is not limited to operations that are performed absolutely simultaneously and can include timings that are intended to be simultaneous but due to manufacturing limitations may not be precisely simultaneously.

For example, due to read/write delays that may be exhibited by various interfaces (e.g., LPDDR5 vs. PCIe), media controllers that are utilized "substantially simultaneously" may not start or finish at exactly the same time. For example, the memory controller 116 can be utilized such that it is reading data from the DRAM 120 and providing that read data to the host computing device 110 while or at the same time (or substantially simultaneously) that the task processor 140 is obtaining other data received through the ethernet adapter 150 and/or storing the received other data in the non-volatile RAM 130.

The functions of the host computer device 110, memory controller 116, task processor 140, ethernet controller 152, external computing device 160 described herein, may be implemented by processing circuitry such as hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims.

By way of background, FIG. 4 shows a conventional host server having a CPU, DRAM and an SSD. In operation, the host CPU is occupied for a number of cycles by receiving and storing data into the SSD (see blocks 401-402 in FIG. 4). The host CPU then becomes occupied for additional cycles when obtaining the data from the SSD, sorting or indexing the obtained data, and storing the sorted or indexed data in the DRAM (see blocks 403-405 in FIG. 4). However, these host CPU cycles can be costly and expensive. It would be beneficial to save these host CPU cycles for execution of more important applications. For example, there are other applications which may be requesting this host to provide data from the DRAM.

The expectation of these other more important applications being executed by the host CPU is that the data from the DRAM can be obtained very quickly so that the host CPU is not locked up or delayed while waiting for the data to be acquired in response to a host command. In other words, if the host CPU of FIG. 4 is currently being occupied by performing any one or more of block(s) 401-405, the other applications being executed by the host CPU would have to wait until these block(s) 401-405 are completely done before the data requested by those other applications is accessed from the DRAM. It would therefore be advantageous to decouple tasks (e.g., blocks 401-405) from the host CPU to thereby enable the host CPU (now having a lighter load by virtue of not having to execute tasks such as blocks 401-405) to executing other applications (e.g., more important applications) to have faster access and lower latency to the already sorted or indexed data stored in the DRAM.

For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Furthermore, the processing circuitry and/or various illustrative blocks and components described in connection with the disclosure herein (including the claims) may be implemented or performed with a general-purpose processor, a digital signal processor (DSP), an ASIC, a field programmable gate array (FPGA) or other programmable logic device, discrete gate or transistor logic, discrete hardware components, or any combination thereof designed to perform the functions described herein.

A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "transmit", "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components.

At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components.

In some examples, the flow of signals between the connected components may be interrupted for a time, for example, using one or more intermediate components such as switches or transistors. The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and a second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and a second condition or action may occur directly, as a result of the previous condition or action occurring independent of whether other conditions or actions occur.

In some examples, a first condition or action may be performed and a second condition or action may occur directly as a result of the previous condition or action occurring, such that no other intermediate conditions or actions occur between the earlier condition or action and the second condition or action or a limited quantity of one or more intermediate blocks or actions occur between the earlier condition or action and the second condition or action. Any condition or action described herein as being performed "based on," "based at least in part on," or "in response to" some other block, action, event, or condition may additionally or alternatively (e.g., in an alternative example) be performed "in direct response to" or "directly in response to" such other condition or action unless otherwise specified.

The devices discussed herein, including a memory array or memory device, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary block that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory media devices) can refer to one or more memory media devices, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A system comprising:

a first interface configured to receive first data from an external computing device; non-volatile memory operatively coupled to the first interface;

a second interface configured to communicate with a host computing device; dynamic random-access memory (DRAM) operatively coupled to the second interface;

a memory controller operatively coupled to the second interface and the DRAM and configured to control a transfer of information between the DRAM and the host computing device through the second interface;

processing circuitry at least configured to store the first data received through the first interface in the non-volatile memory;

an ethernet adapter being configured to receive data to be stored in the non-volatile memory as NVME data packets; and a task processor operatively coupled to the ethernet adapter and including firmware for executing a plurality of tasks associated with the non-volatile memory;

wherein in a bias mode of operation of the system, the task processor is configured to receive the first data from the ethernet adapter and directly store the first data in the non-volatile memory, in place of the processing circuitry; and wherein the non-volatile memory, the DRAM, the memory controller, the task processor and the ethernet adapter are mounted on a same printed circuit board.

2. The system of claim 1, wherein the processing circuitry is further configured to obtain the first data from the non-volatile memory, process the first data obtained from the non-volatile memory, and then store the first data in the DRAM.

3. The system of claim 2, wherein the processing of the first data by the processing circuitry includes sorting or indexing the first data so that the first data is stored in the DRAM in a form that is accessible by the host computing device from the DRAM.

4. The system of claim 2, wherein the memory controller is further configured to obtain the first data stored in the DRAM and provide the first data to the host computing device through the second interface.

5. The system of claim 2, wherein the memory controller is further configured to obtain the first data stored in the DRAM and provide the first data to the host computing device through the second interface while additional data is being received through the first interface and/or while the additional data received through the first interface is being stored in the non-volatile memory.

6. The system of claim 1, wherein:
the system is configured to be switchable between a first mode of operation and a second mode of operation;
in the first mode of operation, the first data stored in the non-volatile memory is processed and transferred to the DRAM; and
in the second mode of operation, the first data stored in the DRAM is accessed by the host computing device through the second interface.

7. The system of claim 6, wherein: in the second mode of operation, the first data stored in the DRAM is accessed by the host computing device through the second interface while additional data is received through the first interface and stored in the non-volatile memory.

8. The system of claim 6, wherein: in the second mode of operation, the memory controller is configured to write updated into the DRAM, the updated first data resulting from processing of the first data by the host computing device, and the updated first data written into the DRAM being accessible by the processing circuitry when the system switches from the second mode of operation to the first mode of operation.

9. The system of claim 1, wherein the first data received through the first interface is stored in the non-volatile memory by storing the first data received through the first interface in the DRAM and then transferring the first data stored in the DRAM to the non-volatile memory.

10. The system of claim 1, wherein each of the non-volatile memory, the DRAM, the memory controller and the processing circuitry is formed by at least one integrated circuit (IC) chip; and
each of the IC chips respectively forming the non-volatile memory, the DRAM, the memory controller and the processing circuitry is mounted on the printed circuit board.

11. The system of claim 9, wherein the first interface includes the ethernet adapter.

12. A method of operating a system comprising a first interface configured to communicate with an external computing device, a non-volatile memory operatively coupled to the first interface, a second interface configured to communicate with a host computing device, a dynamic random-access memory (DRAM) operatively coupled to the second interface, a memory controller operatively coupled to the second interface and the DRAM, processing circuitry an ethernet adapter being configured to receive data to be stored in the non-volatile memory as NVME data packets and a task processor operatively coupled to the ethernet adapter and including firmware for executing a plurality of tasks associated with the non-volatile memory, the method comprising:

receiving first data from the external computing device through the first interface of the system;

conducting communications with the host computing device through the second interface;

controlling, by the memory controller, a transfer of information between the DRAM and the host computing device through the second interface; and storing, by the processing circuitry, the first data received through the first interface in the non-volatile memory;

wherein in a bias mode of operation of the system, the task processor is configured to receive the first data from the ethernet adapter and directly store the first data in the non-volatile memory, in place of the processing circuitry; and wherein the non-volatile memory, the DRAM the memory controller, the processing circuitry, the task processor and the ethernet adapter are mounted on a same printed circuit board.

13. The method of claim 12, further comprising obtaining, by the processing circuitry, the first data obtained from the non-volatile memory, processing the first data obtained from the non-volatile memory, and then storing the first data in the DRAM.

14. The method of claim 13, wherein the processing of the first data by the processing circuitry includes sorting or indexing the first data so that the first data is stored in the DRAM in a form that is accessible by the host computing device from the DRAM.

15. The method of claim 13, further comprising obtaining, by the memory controller, the first data stored in the DRAM and providing the first data to the host computing device through the second interface while additional data is being received through the first interface in the non-volatile memory and/or the additional data received through the first interface is being stored in the non-volatile memory.

16. The method of claim 12, wherein:
switching between a first mode of operation and a second mode of operation;

in the first mode of operation, the first data stored in the non-volatile memory is processed and transferred to the DRAM; and in the second mode of operation, the first data stored in the DRAM accessed by the host computing device through the second interface.

17. The method of claim 16, wherein: in the second mode of operation, the first data stored in the DRAM is accessed by the host computing device through the second interface while additional data is received through the first interface and stored in the non-volatile memory.

18. The method of claim 16, wherein: in the second mode of operation, updated first data is written into the DRAM, the updated first data resulting from processing of the first data by the host computing device, and the updated first data written into the DRAM being accessible by the processing circuitry when the system switches from the second mode of operation to the first mode of operation.

19. The method of claim 12, wherein the first data received through the first interface is stored in the non-volatile memory by storing the first data received through the first interface in the DRAM and then transferring the first data stored in the DRAM to the non-volatile memory for storage of the first data in the non-volatile memory.

20. The method of claim 12, further comprising providing the printed circuit board; wherein each of the non-volatile memory, the DRAM, the memory controller and the processing circuitry is formed by at least one integrated circuit (IC) chip;

each of the IC chips respectively forming the non-volatile memory, the DRAM, the memory controller and the processing circuitry is mounted on the printed circuit board; and the first interface includes the ethernet adapter, the ethernet adapter being mounted on the printed circuit board.

* * * * *